United States Patent [19]

Rogozhin et al.

[11] 3,853,906

[45] Dec. 10, 1974

[54] CHROMATOGRAPHIC METHOD FOR THE SEPARATION OF THE OPTICAL ISOMERS

[76] Inventors: Sergei Vasilievich Rogozhin, ulitsa Vavilova, 55/5, kv. 52; Vadim Alexandrovich Davankov, Leningardskoe shosse, 112/1, korpus 3, kv. 703, both of, Moscow, U.S.S.R.

[22] Filed: June 24, 1969

[21] Appl. No.: 836,165

[52] U.S. Cl.......... 260/309, 260/326.2, 260/326.85, 260/482 R, 260/484 R, 260/502.4 R, 260/502.5, 260/502.6, 260/518 R, 260/518 A, 260/521 A, 260/534 R, 260/534 C, 260/534 L, 260/534 S, 260/561 R, 260/561 P, 260/561 B, 260/584 R, 260/583 EE, 260/944, 260/953, 260/DIG. 8

[51] Int. Cl.............................................. C07b 19/00

[58] Field of Search............ 260/309, 326.3, 326.85, 260/502.4 R, 502.5, 502.6, 518 A, 518 R, 521 A, 534 C, 534 L, 534 S, 534 R, 561 R, 584 R, 583 EE

[56] References Cited

OTHER PUBLICATIONS

Buss et al., Ind. Eng. Chem. 60(8), 12–28 (1968).
Hsu et al., Inorg. Chem. 2, 587–590 (1963); C.A.59:1267b.
Ramaiah et al., Inorg. Chem. 3(2), 296–297 (1964).

*Primary Examiner*—G. Thomas Todd
*Attorney, Agent, or Firm*—Holman & Stern

[57] ABSTRACT

Chromatographic separation of optical isomers capable of forming complexes with transition metal ions by treating an asymmetric sorbent such as an ion exchange resin which is capable of forming complexes with transition metal ions with a solution of a transition metal salt, and then passing a mixture of the isomers through the treated sorbent bed.

3 Claims, No Drawings

CHROMATOGRAPHIC METHOD FOR THE SEPARATION OF THE OPTICAL ISOMERS

This invention relates to chromatographic methods of separation of racemates into constituent optical isomers.

The method of the invention may find application in the chemical, pharmaceutical and food industries, as well as for the laboratory synthesis of optically active compounds. This method is particularly useful for the separation of optically active isomers of amino acids, hydroxy acids, amino alcohols and derivatives thereof.

There are known chromatographic methods of separating optical isomers which comprise passing a racemate solution through an asymmetric sorbent bed, wherein use is made of sorbents consisting of optically active substances, e.g., starch, modified natural products, e.g., carboxycellulose or synthetic ion exchange resins.

Also known in the art are commercial methods of separating optical isomers by subjecting a racemate to repeated fractional crystallization or by carrying out repeated fractional crystallization of a mixture of diastereoisomers obtained by reacting a racemate with an optically active compound.

It is further known to separate optical isomers by methods involving selective modification of racemate derivatives by means of enzymes.

However, all the known chromatographic methods of separating optical isomers suffer from the drawback of having a very limited efficiency. Even where use is made of considerable quantities of asymmetric sorbents, the separation of mixtures of optical isomers remains incomplete and the chromatographic procedures generally yield products that are but slightly enriched with one optical isomer. The aforesaid disadvantages have so far precluded practical uses of the chromatographic method.

The methods directed to the separation of optical isomers by fractional crystallization provide low yields of target products and are exceptionally laborious, an added disadvantage being associated with the fact that fractional crystallization techinques are applicable only in rare instances.

The enzymatic methods of separating optically active isomers have disadvantages in that they call for the preliminary preparation of derivatives of the racemate to be resolved, involve difficulties inherent in the separation of the resultant mixture of the enzyme and the products of enzyme interaction with each optical isomer, and also entail enzyme losses. Moreover, the enzymatic methods are restricted to the separation of optical isomers of derivatives of natural $\alpha$-amino acids, insofar as $\alpha$-amino acids are the natural substrates for the enzymes used.

It is an object of the present invention to obviate the aforementioned disadvantages.

It is a further and more specific object of the present invention to provide a highly efficient and adequately versatile chromatographic method of separating optical isomers.

This object is accomplished by the provision of a chromatographic method for the separation of the optical isomers of compounds capable of forming complexes with transition metal ions, which comprises passing a solution of the mixture of the aforesaid isomers through the bed of an asymmetric sorbent, e.g., an ion-exchange resin, which is capable of forming complexes with transition metal ions, wherein, according to the invention, the sorbent is pre-treated with a transition metal salt solution.

The separation of optical isomers by the method of the invention proceeds due to the formation of a complex constituted by the transition metal ion, the functional groups of the asymmetric sorbent, and the molecules of the optical isomers being separated, the stability of such mixed complexes being largely dependent upon the steric constitution of molecules of the isomers being separated. One optical isomer will be more strongly retained by the asymmetric sorbent than the other optical isomer, thereby making possible the separation of the isomers in question in the course of the chromatographic process.

The method of the invention is useful for the separation of the optical isomers of compounds whose molecules contain one or several functional groups capable of forming complexes with transition metal ions. The functional groups of this type include amino, carboxy, ester, amide, hydroxy, phosphoryl, sulphide, carbonyl, mercapto etc., while the compounds containing said functional groups represent important classes of organic compounds and include $\alpha$-and $\beta$-aminocarboxylic and aminophosphonic acids, $\alpha$- and $\beta$-hydroxycarboxylic and hydroxphosphonic acids, mercaptoacids, amino alcohols and aminothiols, dicarboxylic acids, amides, esters and acyl derivatives of the aforesaid compounds, and also amines, amine oxides, etc.

The salts of transition metals are selected from the group consisting of mineral and organic salts of copper, zinc, nickel, cobalt, cadmium, chromium, manganese, iron, lead, silver, platinum, palladium, rhodium, gold, mercury, etc.

Ion-exchange resins containing optically active groupings capable of forming adequately stable complexes with transition metal ions can be used as asymmetric sorbents. The preferred asymmetric sorbents consist of products obtained by reacting chloromethylated styrene copolymers cross-linked by divinylbenzene or other cross-linking agents with optically active $\alpha$-or $\beta$-aminocarboxylic or aminophosphonic acids, and amides or esters thereof. Use can also be made of sorbents consisting of products prepared by polycondensation of optically active complexing compounds, e.g., the products obtained by reacting formaldehyde with tyrosine or derivatives thereof. Also useful are asymetric sorbents based on natural polymeric products, e.g., sorbents derived form chitosan, alginic acid, etc.

The present chromatographic method of separating optical isomers is accomplished in the following manner.

An asymmetric sorbent is treated with a solution of a transition metal salt in water or organic solvent, charged into a chromatographic column and wahed with water or organic solvent. Next into the column is fed the solution of a racemic compound in water or organic solvent, followed by washing the column with the solvent used until one of the optical isomers being separated is completely displaced from the column. The second isomer, which forms with the sorbent a more stable complex, is eluted from the column by subsequent passage of the solvent, or desorbed as a result of varying the pH of the solvent or feeding into the column displacing agents, or else by changing the solvent or raising the column temperature. Evaporation or respective eluate fractions yields optically pure isomers.

Where the optical isomers being chromatographed form a strong complex with the metal ion previously retained by the sorbent, and effect partial entrainment of the ion, the eluate should be passed through an auxiliary, small-size column packed with the same sorbent as is the prinicipal column. However, the sorbent in the auxiliary column is not pre-treated with the solution of a transition metal salt, so that the solution of the optical isomers, while flowing through said column, is feed completely from the metal ions entrained from the principal column. On completing a series of chromatographic cycles, the metal ions in the auxiliary column are desorbed by washing the sorbent with an acid solution and directed to the prinicipal column where the metal ions are sorbed by the ion-exchange resin.

It is likewise feasible to carry out the chromatographic process involving the entrainment of metal ions from the sorbent by employing only one column and, hence dispensing with the auxiliary column referred to above. To do so, the column top and bottom are packed with the sorbent that contains no metal ions, in which instance each chromatographic cycle causes the central zone of the sorbent that contains metal ions to be somewhat displaced upwardly or downwardly depending upon the direction of eluent flow, provision being made to alternate the direction of successive chromatographic cycles.

If necessary, recourse may be had to regenerating the sorbent after each chromatographic cycle by washing the column with appropriate solvents.

The method of the invention is conducive to automating all process sequences.

For a better understanding of the invention, presented herein below by way of illustration are specific examples embodying the chromatographic method of the separation of optical isomers.

EXAMPLE 1

The asymmetric sorbent (ion-exchange resin) consisting of base units having the following structure

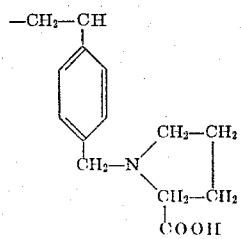

is prepared as disclosed below.

A mixture of 98.5 percent styrene and 1.5 percent divinylbenzene is subjected to suspension polymerization, and the copolymer fraction having a particle column. On of 0.05 – 0.10 mm is then chloromethylated. The resultant product containing 20.5% Cl is treated with L-proline taken in an amount of 2.25 moles per 1 mole of chloromethyl groups and with sodium iodine taken in an amount of 0.30 moles per 1 mole of chloromethyl groups, the reaction being carried out in an excess of a dioxane-methanol mixture (6:1 by volume) at a temperature of 60°C for a period of 15 hours.

The analytical exchange capacity of the sorbent equals 2.2 mg equiv. per gram. The sorbent is noted for its chemical stability and mechanical strength.

Then the sorbent is treated with an excess of 0.1N solution of copper sulphate in 0.5N ammonia (30 ml of the solution per 1 g of the sorbent). 13 g of the dark-blue sorbent is charged into the column (d = 9 mm; l = 500 mm) and washed with 0.5N ammonia solution and water until the washings are neutral. Placed after the prinicpal column is a second small column (d = 9 mm; l = 100 ml) packed with 2 g of the aforesaid sorbent not treated with the copper salt solution.

A solution of 0.5 g of D,L-proline in 5 ml of water is introduced into the column and then the system is washed with distilled water at a water feed rate of 10 ml/hr. Collected at the outlet side of the system (after the second column) is the eluate which gives a positive reaction with ninhydrin. Eluate evaporation yields 0.25 g of optically pure L-proline, $[\alpha]_D^{20} = -80.5°$ ($C = 1$; water).

D-proline is eluted from the columns by passing there-through 100 ml of a 1N solution of ammonia, the separation of D-proline from the eluate being also effected by the evaporation technique. The yield of optically pure D-proline equals 0.25 g, $[\alpha]_D^{20} = 80.5°$ ($C = 1$; water).

The sorbents in the principal and auxiliary columns are regenerated by washing with distilled water until the washing show neutral reaction.

After three chromatographic cycles, the sorbent contained in the auxiliary column is saturated with copper ions, as evidenced by sorbent colouration, and sorbent regeneration is accomplished by 0.5N hydrochloric acid which readily decomposes the copper complex.

The copper ions thus eluted are again absorbed in the principal column after adjusting the copper solution to pH > 6 with ammonia.

EXAMPLE 2

The process is carried out in the columns and with the sorbents described in Example 1. 0.3 g of D,L-valine dissolved in 6 ml of water is introduced into the first column, and the system is washed with water. Evaporation of the eluate yields 0.15 g of optically pure L-valine, $[\alpha]_D^{20} = 28.2°$ ($C = 1$; 5N HCl).

An equivalent amount of optically pure D-valine is eluted with 1N ammonia.

The regeneration of the sorbents is effected in accordance with the procedure of Example 1.

EXAMPLE 3

The process is carried out in the columns and with the sorbents described in Example 1. 0.5 g of D,L-valinamide in 6 ml of water is introduced into the first column. Elution with water yields 0.25 g of L-valinamide, $[\alpha]_D^{20} = 17.8°$ ($C = 1$; ethanol), while the subsequent elution with 1N ammonia solution yields 0.25 g of optically pure D-valinamide.

The sorbents are regenerated by following the procedure of Example 1.

EXAMPLE 4

The procedure of Example 1 is employed to completely separate the optical isomers from the following racemic compounds: α- alanine, isovaline, leucine, isoleucine, methionine, allotreonine, β-phenyl-β-alanine. 1-amino-2-propanol, and also from the compound of the formula

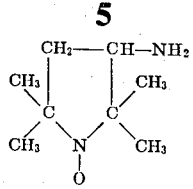

The resolution procedure involves, in all instances, the introduction of 0.4 g of the racemic compound to be resolved in water into the column.

EXAMPLE 5

The process is carried out in the columns and with the sorbents disclosed in Example 1. A solution of 0.2 g of D,L-α-hydroxyphenylacetic acid (mandelic acid) in 2 ml water is introduced into the first column, and the system is washed with water fed at a rate of 10 ml/hr. The eluate is collected portionwise (in 10-ml fractions), L—(+)-mandelic acid being eluted first, followed by the elution of the D—(—)-isomer. The intermediate fractions containing mandelic acid in an amount of 0.08 - 0.1 g and having an optical purity less than 100 percent are subjected to repeated processing by combining said fractions with the next batch of the racemic mandelic acid to be resolved.

Each chromatographic cycle yields 0.05 - 0.06 g of optically pure L—(+)-mandelic acid and the same amount of the D—(—)-isomer.

EXAMPLE 6

The process is carried out in the columns and with the sorbents disclosed in Example 1. A 3 percent aqueous solution of racemic valine is passed through the system at a rate of 9 ml/hr, and the eluate is collected in 10-ml fractions, the content and optical purity of valine being determined in each fraction. The first 60 ml of the eluate contain 1.45 g of optically pure L-valine, while in the subsequent fractions of the eluate the optical purity of L-valine is diminished. After washing the system throughly with water, elution is effected with 1N ammonia and the eluate contains 1.8 g of D-valine having an optical purity of 98 percent.

The sorbents are regenerated by following the procedure of Example 1.

EXAMPLE 7

The process is carried out in the columns and with the sorbents disclosed in Example 1. The system is washed with a 0.01N solution of ammonia in absolute methanol. 0.2 of racemic α-formylamino-β-(p-dichlorodiethylaminophenyl)-propionic acid dissolved in 2 ml of methanol is introduced into the first column, and the system is washed with a 0.01N methanolic solution of ammonia at a rate of 9 ml/hr. The eluate is collected portionwise (in 3-ml fractions). The evaporation of the fractions Nos. 6–16 yields 0.1 g of the optically pure laevorotary isomer, the same amount of the dextrorotary isomer being obtained by evaporating the fractions Nos. 20 – 31.

EXAMPLE 8

The asymmetric sorbent containing L-aspartic acid residues is prepared by treating the chloromethylated styrene-divinylbenzene copolymer of Example 1 with dimethyl L-aspartate taken in an amount of 2.25 moles per mole of chloromethyl groups and with sodium iodide taken in an amount of 0.30 mole per mole of chloromethyl groups, said treatment being carried out in an excess of dioxane for a period of 15 hours at a temperature of 50°C.

To saponify the ester groups, the sorbent is maintained in a mixture of dioxane and 1 N sodium hydroxide solution (dioxane-to-sodium hydroxide solution volume ratio, 1:1) at room termperature for 5 days.

The sorbent thus prepared has an analytical exchange capacity of 2.6 mg-equiv. per gram.

11.5 g of the sorbent treated with a copper sulphate solution is charged into the column and washed with an ammmonia solution and water by following the procedure of Example 1. 2 g of the sorbent free from copper ions is charged into the auxiliary, small column. 1 ml of a 10 percent aqueous solution of D,L-proline is introduced into the first column, and the system is washed with a 0.05N solution of ammonia to elute 0.05 g optically pure L-proline. To elute the optically pure D-isomer, use is made of a 1N solution of ammonia.

The sorbents are regenerated with a 0.05N solution of ammonia.

EXAMPLE 9

The asymmetric sorbent containing L-histidine is synthesized by using methyl ester of L-histidine, sodium iodide and dioxane taken in the amounts specified in and in accordance with the procedure of Example 8. The ester groups are saponified by maintaining the sorbent in a mixture of dioxane and 1N alkali solution (dioxane-to- alkali solution volume ratio, 1:1) for a period of 5 days at room temperature.

The analytical exchange capacity of the sorbent thus prepared equals 2.1 mg-equiv. per gram.

14 g of the sorbent treated with a 0.1N solution of nickel acetate in 0.5N ammonia is charged into the first column, while 2 g of the untreated sorbent is placed in the second, small column, and the entire system is flushed with water. 0.25 g of D,L-threonine dissolved in 4 ml water is introduced into the first column, and elution of the system with 0.05N aqueous ammonia yields 0.125 g of the optically pure L-isomer, while the same amount of the optically pure D-isomer is obtained by eluting the system with 0.5 N aqueous ammonia.

EXAMPLE 10

The asymmetric sorbent containing the residues of optically active α-aminophosphonic acid is prepared by using (+)—diethylα-aminobenzylphosphonate, sodium idoide and dioxane in the amounts specified in and in accordance with the procedure of Example 8. To hydrolyze the ester groups, the sorbent is heated with concentrated hydrochloric acid at 100°C for a period of 3 hours.

The resulting sorbent is noted for its exchange capacity of 1.55 mg-equiv. per gram. 13 g of the sorbent treated with a solution of copper sulphate as disclosed in Example 1, is washed in the column with 1N ammonia and water.

0.5 g of D,L-proline dissolved in 0.5N aqueous ammonia is introduced into the column, and subsequent elution with 0.5N aqueous ammonia makes it possible to resolve the amino acid into two equal fractions, the thus-separated isomers having an optical purity of 87 percent.

EXAMPLE 11

The asymmetric sorbent derived from L-thyrosine is prepared by heating a 15 percent solution of L-thyrosine in a mixture of formalin and concentrated hydrochloric acid, the formalin-to-hydrochloric ration being 1:1 by volume, followed by allowing the resulting gel to harden at a temperature of 115°C for a period of 3 hours.

The resin thus obtained is comminuted and the 0.05 − 0.15 mm fraction is used as sorbent. Treating the resin with a solution of copper sulphate, as disclosed in Example 1, confers to the sorbent dark-blue, nearly black coloration 11 g of the treated sorbent is charged into the first column, while the second column is packed with 2 g of the sorbent free from copper ions. The system is then flushed with water and used to effect the quantitative resolution of 0.5 of D,L- alanine into optical isomers, the elution of L-alanine being carried out by water, while the D-isomer is eluted with 0.5N aqueous ammonia.

The sorbents in the main and auxiliary columns are regenerated by washing with distilled water until the effluents show a neutral reaction.

Although the present invention has been described with reference to the preferred embodiment thereof, other modifications and changes thereof will readily occur to those skilled in the art, and the present invention is intended to be limited only by the appended claims.

We claim:

1. A method for the chromatographic separation of the optical isomers of compounds capable of forming complexes with transition metal ions which comprises treating an asymmetric ion-exchange resin capable of forming complexes with transition metal ions with a solution of a salt of a transition metal selected from the group consisting of copper, zinc, nickel, cobalt, cadmium, chromium, manganese, iron, lead, and silver, and passing through the treated sorbent bed a solution of the mixture of said isomers.

2. The method of claim 1, wherein said compounds are selected from the group consisting of $\alpha$-and $\beta$-aminocarboxylic acids, $\alpha$- and $\beta$aminophosphonic acids, $\alpha$- and $\beta$- hydroxycarboxylic acids, $\alpha$- and $\beta$hydroxyphosphonic acids, mercaptoacids, amino alcohols, aminothiols, dicarboxylic acids, amides, esters and acyl derivatives of the foregoing, amines and amine oxides.

3. The method of claim 1, wherein said asymmetric ion-exchange resin contains optically-active groupings of $\alpha$- or$\beta$-aminocarboxylic acids, or $\alpha$-or $\beta$-aminophosphonic acids.

* * * * *